United States Patent
Herring et al.

(10) Patent No.: US 11,243,030 B2
(45) Date of Patent: Feb. 8, 2022

(54) HEAT EXCHANGERS

(71) Applicant: Hamilton Sundstrand Corporation, Charlotte, NC (US)

(72) Inventors: Neal R. Herring, East Hampton, CT (US); Ram Ranjan, West Hartford, CT (US); Brian St. Rock, Andover, CT (US); Joseph Turney, Amston, CT (US); Andrzej E. Kuczek, Bristol, CT (US); Michael K. Ikeda, West Hartford, CT (US); Thomas M. Yun, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 412 days.

(21) Appl. No.: 14/994,518

(22) Filed: Jan. 13, 2016

(65) Prior Publication Data
US 2017/0198977 A1    Jul. 13, 2017

(51) Int. Cl.
| | | |
|---|---|---|
| F28D 7/02 | (2006.01) | |
| F28F 9/02 | (2006.01) | |
| F28D 7/00 | (2006.01) | |
| F28F 7/02 | (2006.01) | |

(52) U.S. Cl.
CPC ............... *F28D 7/0066* (2013.01); *F28F 7/02* (2013.01); *F28F 9/02* (2013.01); *F28F 9/0268* (2013.01); *F28F 2255/18* (2013.01)

(58) Field of Classification Search
CPC ............... F28F 7/02; F28F 9/02; F28F 9/0268
USPC .................................................. 165/165, 174
See application file for complete search history.

(56) References Cited

U.S. PATENT DOCUMENTS

| | | | | |
|---|---|---|---|---|
| 910,192 | A * | 1/1909 | Grouvelle et al. ...... | F28F 13/12 165/177 |
| 2,099,186 | A * | 11/1937 | Anderegg ............. | F28F 9/0268 165/174 |
| 2,343,542 | A * | 3/1944 | Faunce ................... | F28D 1/024 165/174 |
| 3,291,206 | A * | 12/1966 | Nicholson ................ | F28F 3/04 165/166 |
| 3,679,384 | A * | 7/1972 | Colson et al. ............ | B32B 3/12 65/439 |
| 3,926,251 | A * | 12/1975 | Pei ........................ | C03B 23/207 165/165 |
| 3,948,317 | A * | 4/1976 | Moore .................. | F28D 19/042 165/165 |

(Continued)

FOREIGN PATENT DOCUMENTS

| | | |
|---|---|---|
| WO | WO-94/10520 A1 | 5/1994 |
| WO | WO-03/033985 A1 | 4/2003 |
| WO | WO-2011/0115883 A2 | 9/2011 |

OTHER PUBLICATIONS

European Extended Search Report dated Jun. 14, 2017, in corresponding European Patent No. 16207469.4.

*Primary Examiner* — Leonard R Leo
(74) *Attorney, Agent, or Firm* — Locke Lord LLP; Scott D. Wofsy; Georgi Korobanov

(57) ABSTRACT

A heat exchanger includes a body, a plurality of first flow channels defined in the body; and a plurality of second flow channels defined in the body. The second flow channels are fluidly isolated from the first flow channels. The first flow channels and second flow channels are arranged in a checkerboard pattern.

7 Claims, 8 Drawing Sheets

(56) References Cited

U.S. PATENT DOCUMENTS

| | | | |
|---|---|---|---|
| 4,044,825 A * | 8/1977 | Gugenberger | F28F 9/02 165/165 |
| 4,379,487 A * | 4/1983 | Krakow | B01F 5/0641 165/165 |
| 4,898,234 A | 2/1990 | McGovern et al. | |
| 5,002,123 A | 3/1991 | Nelson et al. | |
| 5,531,266 A * | 7/1996 | Ragi | F28F 9/0268 165/174 |
| 7,111,673 B2 | 9/2006 | Hugill | |
| 7,240,723 B2 * | 7/2007 | Wu | F28D 7/16 165/158 |
| 7,285,153 B2 | 10/2007 | Bruun et al. | |
| 8,695,687 B2 * | 4/2014 | Paschkewitz | B21C 37/08 165/146 |
| 9,010,405 B1 | 4/2015 | Bharathan et al. | |
| 9,134,072 B2 | 9/2015 | Roisin et al. | |
| 9,370,761 B2 * | 6/2016 | Hamada | F28F 13/08 |
| 2010/0300666 A1 | 12/2010 | Hislop et al. | |

\* cited by examiner

HEAT EXCHANGERS

BACKGROUND

1. Field

The present disclosure relates to heat exchangers, more specifically to more thermally efficient heat exchangers.

2. Description of Related Art

Conventional multi-layer sandwich cores are constructed out of flat sheet metal dividing plates, spacing bars, and two dimensional thin corrugated fins brazed together. The fabrication process is well established and relatively simple. However, the manufacturing simplicity has a negative impact on the performance. The channel geometry is two dimensional and does not allow for aspect ratio change that has an impact on flow distribution and pressure drop. In addition, the integrity to the structure is limited by the strength and quality of the braze joints which may be subject to stress concentration since there is no mechanism to control the size of the corner fillets. Flat geometry of the dividing plates exposed to high pressure causes bending, so thicker plates are used to reduce the stress level at the expense of the weight.

Such conventional methods and systems have generally been considered satisfactory for their intended purpose. However, there is still a need in the art for improved heat exchangers. The present disclosure provides a solution for this need.

SUMMARY

A heat exchanger includes a body (e.g., a heat exchanger core), a plurality of first flow channels defined in the body; and a plurality of second flow channels defined in the body. The second flow channels are fluidly isolated from the first flow channels. The first flow channels and second flow channels are arranged in a checkerboard pattern.

The first and/or second flow channels can include a changing flow area along a length of the body. The changing flow area can increase a first flow area toward a first flow outlet of the heat exchanger. The changing flow area can decrease a second flow area toward the first flow outlet as the first flow area increases.

The first and/or second flow channels can include a changing flow area shape. The changing flow area shape can include a first polygonal flow area at a first flow inlet which transitions to a second polygonal flow area having more sides at a first flow outlet.

The changing flow area shape can include a first polygonal flow area at a second flow inlet which transitions to a second polygonal flow area having more sides at a second flow outlet. The first and/or second flow channels can include at least one of a rhombus shape, a hexagonal shape, an octagonal shape, or any other suitable shape.

The heat exchanger can further include a header transition portion where the first and/or second flow channels transition from the checkerboard pattern to an aligned pattern such that the first flow channels can be aligned in one or more first columns and/or rows, wherein the second flow channels can be aligned in separate second columns and/or rows that are parallel with the first columns and/or rows. The first columns and/or rows can alternate with the second columns and/or rows.

The heat exchanger can include a header fluidly connected to the first flow channels and/or the second flow channels via a plurality of first vanes and/or second vanes, respectively, wherein the vanes can connect individually to each flow channel and converge at an inlet/outlet of the header.

The first columns and/or rows can merge together to form slot shaped channels. The second columns and/or rows can merge together to form slot channels.

The heat exchanger can further include a header having a plurality of slot shaped header channels extending from an inlet/outlet of the header, wherein the slot shaped header channels can converge at the inlet/outlet and align with the first and/or second columns and rows.

In accordance with at least one aspect of this disclosure, A method for manufacturing a heat exchanger can include forming a body to include a plurality of first flow channels and a plurality of second flow channels such that the second flow channels are fluidly isolated from the first flow channels, and such that the first flow channels and second flow channels are arranged in a checkerboard pattern. Forming the heat exchanger can include additively manufacturing the heat exchanger.

Additively manufacturing the heat exchanger can include monolithically forming a header transition portion in fluid communication with the flow channels. Forming the header transition portion can include modifying the checkerboard pattern to transition into an aligned pattern to fluidly connect to a header within the header transition portion. Additively manufacturing the heat exchanger can include monolithically forming the header in fluid communication with the header transition portion.

In accordance with at least one aspect of this disclosure, a monolithic header transition portion for a heat exchanger can include a first end including a plurality of first and/or second transition channels configured to be in fluid communication with first and/or second flow channels, respectively, disposed in a checkerboard pattern, and a second end including the transition channels arranged in an aligned pattern and configured to be in fluid communication with a header such that flow can transition from the checkerboard pattern and converge into the header in columns and/or rows.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
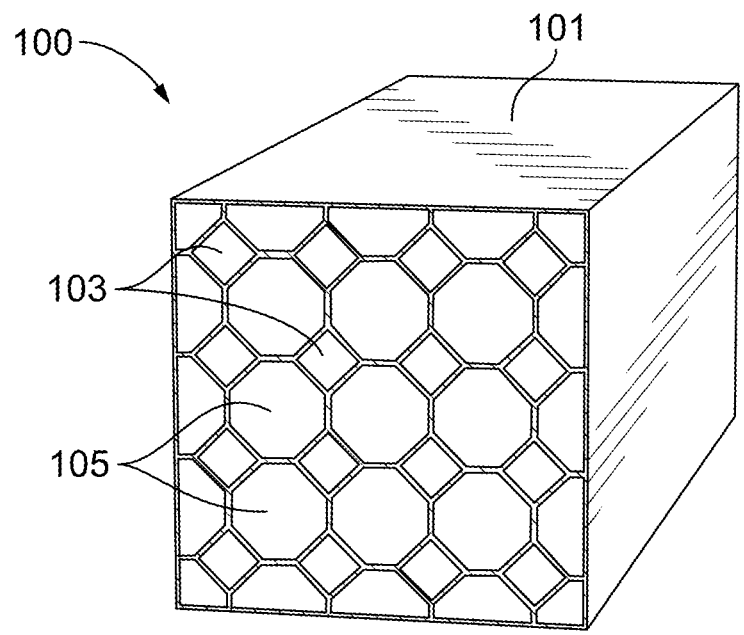
FIG. 1A is a perspective view of an embodiment of a heat exchanger in accordance with this disclosure, showing a hot flow inlet/cold flow outlet of the heat exchanger.

Reference will now be made to the drawings wherein like reference numerals identify similar structural features or aspects of the subject disclosure. For purposes of explanation and illustration, and not limitation, an illustrative view of an embodiment of a heat exchanger in accordance with the disclosure is shown in FIG. 1A and is designated generally by reference character 100. Other embodiments and/or aspects of this disclosure are shown in FIGS. 1B-7. The systems and methods described herein can be used to reduce weight and/or increase performance of heat transfer systems.

Referring to FIG. 1A, a heat exchanger 100 includes a body 101, a plurality of first flow channels, e.g., hot flow channels 103 as described herein, defined in the body 101, and a plurality of second flow channels, e.g., cold flow channels 105 as described herein, defined in the body 101. While hot flow channels 103 and the cold flow channels 105 are described with respect to a relative temperature of flow therein, it is contemplated that the hot flow channels 103 can be used for cold flow and vice versa, or any other suitable arrangement.

The cold flow channels 105 are fluidly isolated from the hot flow channels 103. At least one of the hot flow channels 103 or the cold flow channels 105 can include a changing characteristic along a length of the body 101. However, it is contemplated that the flow channels 103, 105 can have constant characteristics along the length of the body 101. The body 101 can be made of metal and/or any other suitable material.

The hot flow channels 103 and the cold flow channels 105 can be utilized in a counter-flow arrangement such that cold flow and hot flow are routed through the heat exchanger 100 in opposing directions. Also, as shown, the hot flow channels 103 and the cold flow channels can be arranged such that hot and cold channels alternate (e.g., in a checkerboard pattern as shown). In this regard, when looking at a cross-section of body 101, each hot flow channel 103 can be disposed between a plurality of cold flow channels 105, and each cold flow channel 105 can be disposed between a plurality of hot flow channels 103. The checkerboard pattern can be formed in any suitable portion of the body 101 (e.g., through the entire body 101 such that any cross-section of the body 101 and/or end of the body 101 has the checkerboard pattern). While a checkerboard pattern is described, it is not intended to limit the cross-sectional shape of the flow channels 103, 105 to square shapes.

The flow channel 103, 105 can include any suitable shape (e.g., one or more of rhombuses, hexagons, and octagons). However, while the flow channels 103, 105 are shown as polygons, the shapes need not be polygonal or rectilinear or symmetric. For example, the flow channels 103, 105 can have any suitable non-linear and/or non-symmetric cross-sectional shape.

As appreciated by those skilled in the art, polygonal shapes can be described using the four parameters as described below. In FIG. 1D, the four parameters are shown. As shown, the full width A and height B are always greater than zero. The secondary width C and height D can be zero up to the full width and height. If C>0 and D>0, the shape is an octagon, if C>0 and D=0 (or C=0 and D>0), the shape is a hexagon, and if C=0 and D=0, the shape is a rhombus.

Figure 2:
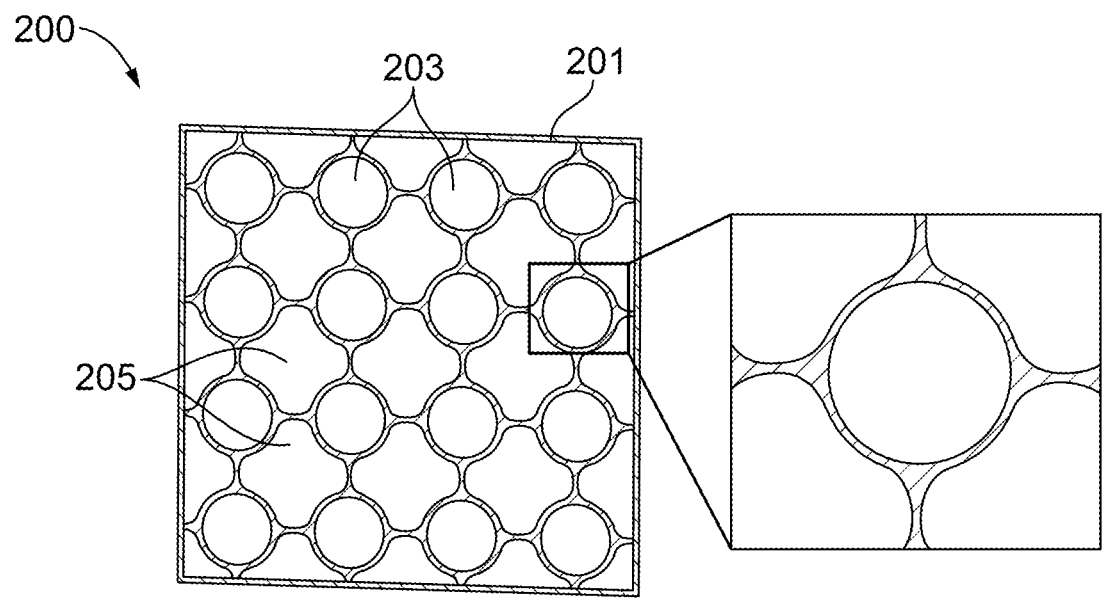
FIG. 2 is a cross-sectional view of an embodiment of a heat exchanger in accordance with this disclosure.

Any other suitable flow area shapes for the hot flow channels 103 and/or the cold flow channels 105 are contemplated herein. For example, as shown in FIG. 2, a heat exchanger 200 can include elliptical flow channels 203 and/or non-elliptical flow channels 205 (e.g., rounded cross shaped) defined in body 201.

Figure 1B:
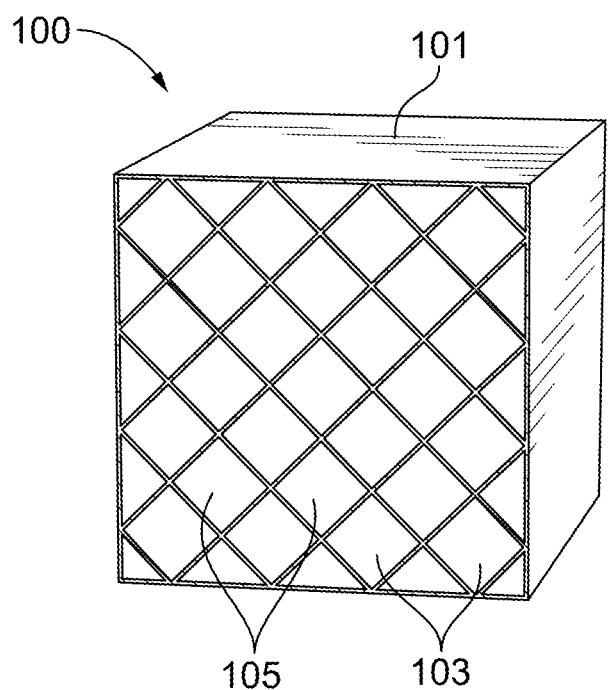
FIG. 1B is a perspective cross-sectional view of the heat exchanger of FIG. 1A, showing a middle portion of the heat exchanger.
Figure 1C:
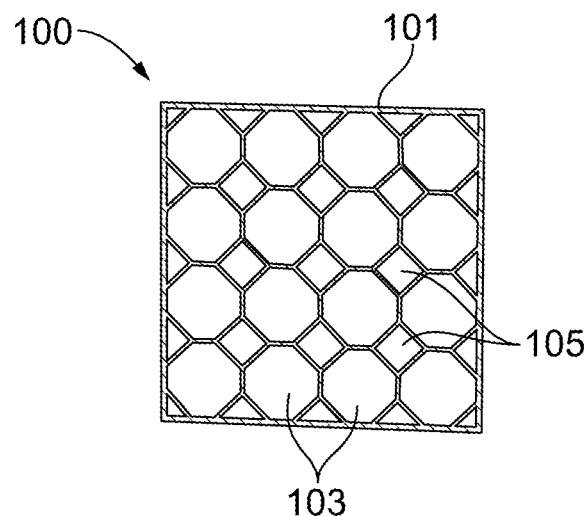
FIG. 1C is a perspective cross-sectional view of the heat exchanger of FIG. 1A, showing a hot flow outlet/cold flow inlet of the heat exchanger.
Figure 1D:
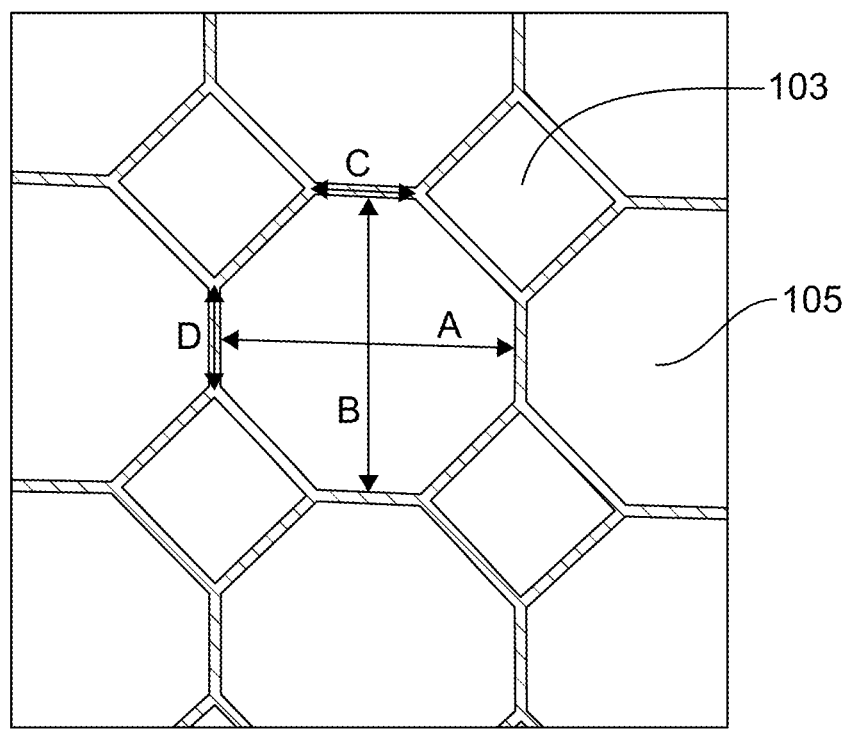
FIG. 1D is a scaled up view of a portion of the heat exchanger of FIG. 1A.

As shown in FIGS. 1A, 1B, and 1C, one or more flow channels 103, 105 can include changing characteristics. The changing characteristics can include a changing flow area. For example, the changing flow area can increase a hot flow area toward a hot flow outlet of the heat exchanger 100 (e.g., as shown in transitioning from FIG. 1A, through FIG. 1B, to FIG. 1C). Similarly, the changing flow area can decrease a cold flow area toward the hot flow outlet as the hot flow area increases (which may be a function of the increasing hot flow area in order to maintain total area of the body 101). It is contemplated that one or more of the hot flow channels 103 or the cold flow channels 105 may maintain a constant flow area or change in any other suitable manner.

In certain embodiments, the changing characteristic of the hot and/or cold flow channels 103, 105 can include a changing flow area shape. In certain embodiments, the changing flow area shape can include a first polygonal flow area at a hot flow inlet (e.g., a rhombus as shown in FIGS. 1A and 1B) which transitions to a second polygonal flow area having more sides at a hot flow outlet (e.g., a hexagon as shown in FIG. 3). Also as shown, the changing flow area shape can include a first polygonal flow area at a cold flow inlet (e.g., a rhombus as shown in FIGS. 1C and 1B) which transitions to a second polygonal flow area having more sides at a cold flow outlet (e.g., a hexagon as shown in FIG. 1A). Any other suitable changing shape along a length of the body 101 is contemplated herein (e.g., any desired change of A, B, C, and/or D as shown in FIG. 1D).

Figure 3A:
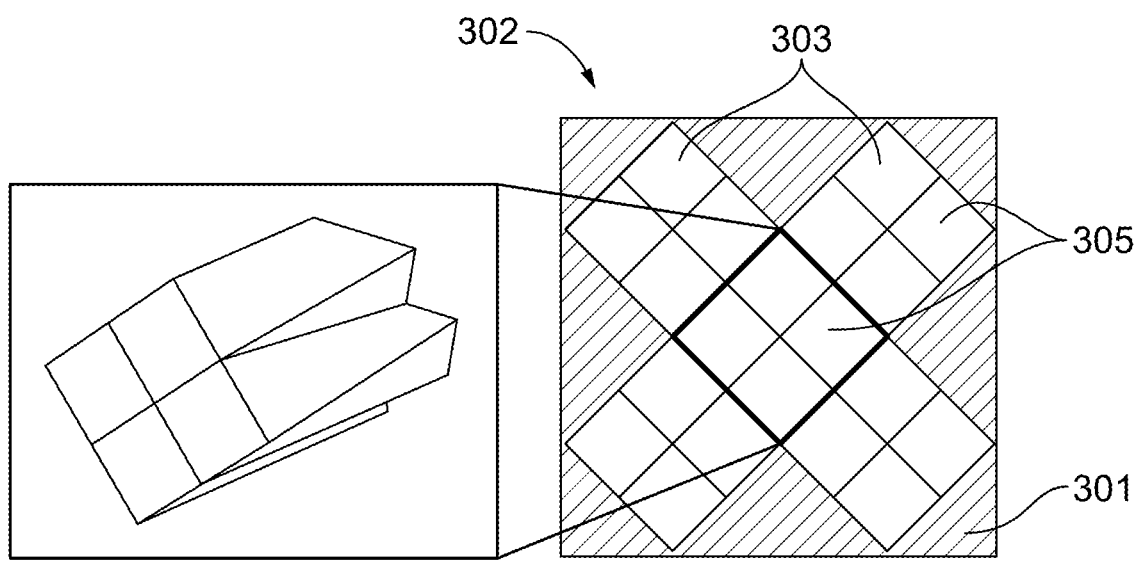
FIG. 3A is a cross-sectional view of an embodiment of a first end of a header transition portion of a heat exchanger in accordance with this disclosure, also showing a portion of the transition portion in perspective.

Referring additionally to FIGS. 3A-3C and FIGS. 4A-4C, a heat exchanger 100 can further include a header transition portion 301 (shown in various cross-sections throughout 3A-4C). The header transition portion 301 includes a first end 302 (as shown in FIG. 3A) that includes a plurality of hot and/or cold transition channels 303, 305 configured to be in fluid communication with hot and/or cold flow channels 103, 105, respectively. In this regard, the transition channels 303, 305 at the first end 302 are disposed in a corresponding checkerboard pattern to the flow channels 103, 105. While the transition channels 303, 305 are shown as rhombi, the transition channels 303, 305 at the first end 302 can include any suitable corresponding flow area shape (e.g., rhombus, hexagon, polygon, or any other suitable shape) to correspond with the flow channels 103, 105.

Figure 3B:
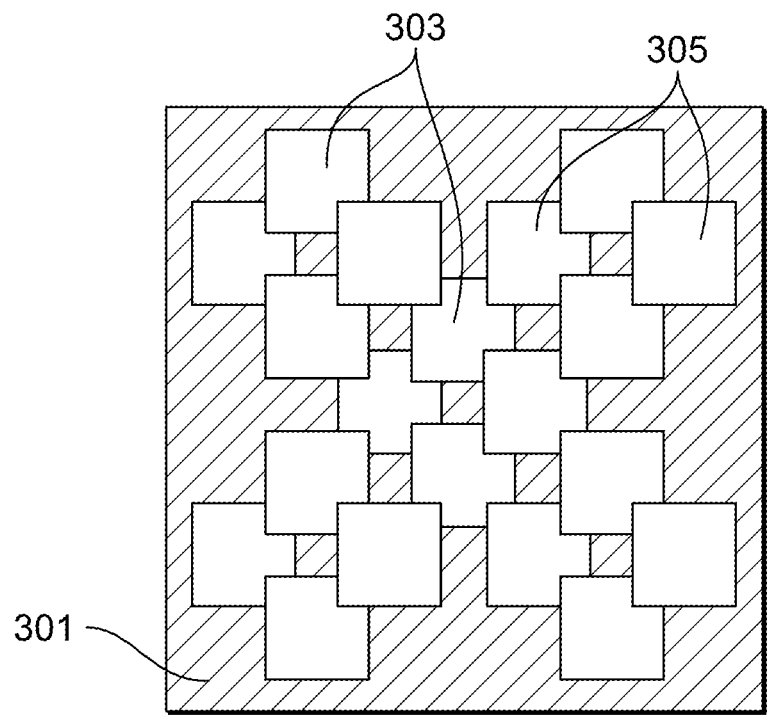
FIG. 3B is a cross-sectional view of an intermediate portion of the header transition portion of FIG. 3A.
Figure 3C:
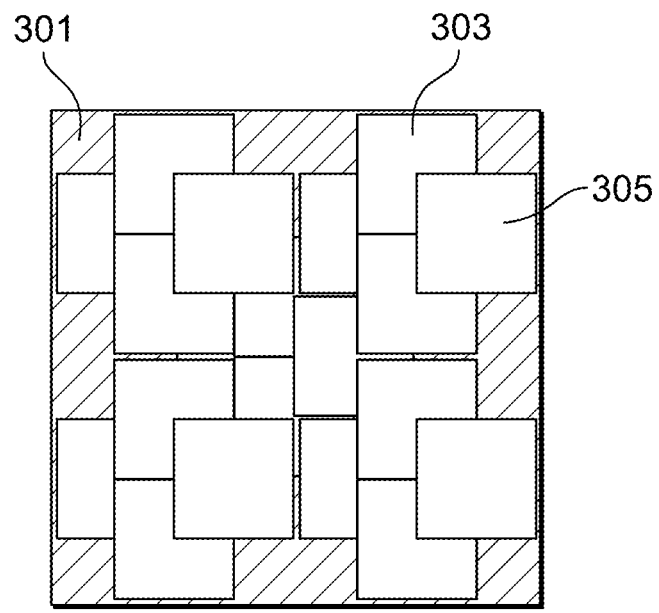
FIG. 3C is a cross-sectional view of another intermediate portion of a header transition portion of a heat exchanger in accordance with this disclosure.
Figure 4A:
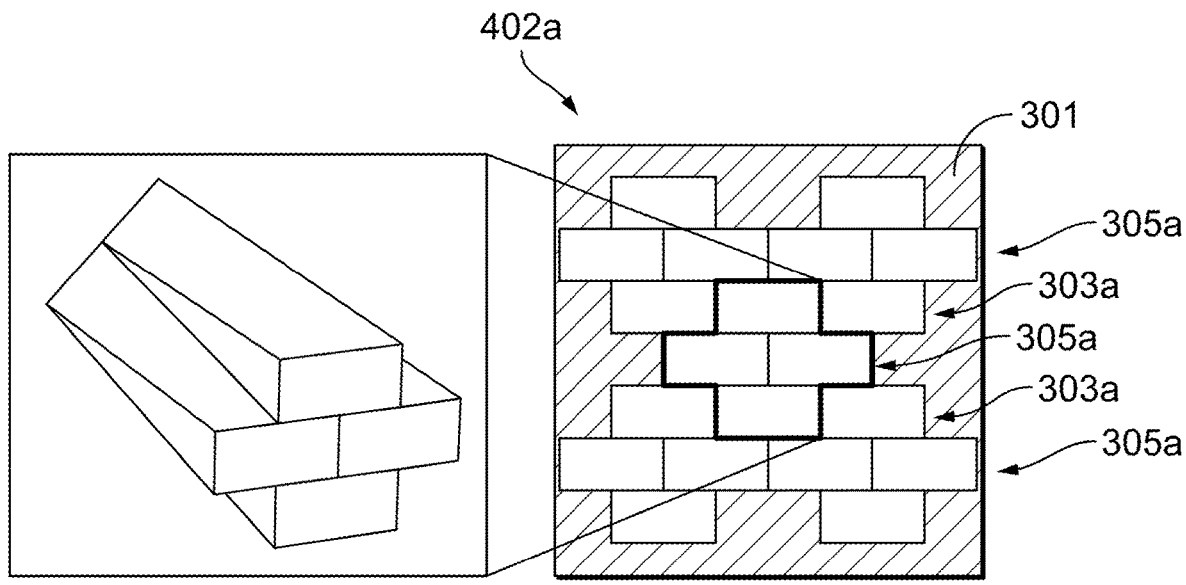
FIG. 4A is a cross-sectional view of an embodiment of a second end of the header transition portion of FIG. 3A, also showing a portion of the transition portion in perspective.
Figure 4B:
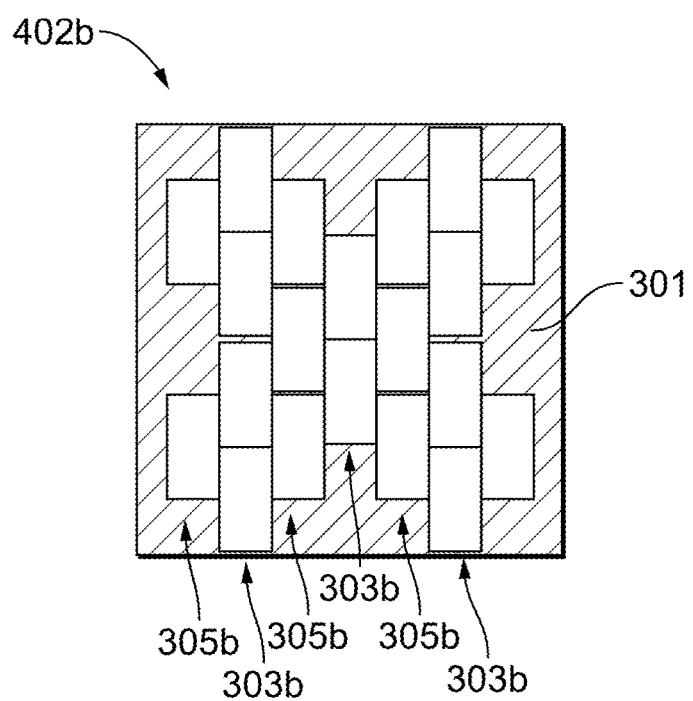
FIG. 4B is a cross-sectional view of another embodiment of a second end of the header transition portion of FIG. 3A.

Referring to FIGS. 3B and 3C, the transition channels 303, 305 can morph in shape and size while remaining fluidly isolated from each other such. The transition channels 303, 305 can morph in a suitable predetermined way until they are in a suitable aligned pattern at a second end 402a, 402b, 402c as shown in the embodiments of FIGS. 4A-4B. As shown, the header transition portion 301 includes a second end 402a, 402b, 402c that includes the transition channels 303, 305 morphed and arranged in an aligned pattern.

In this regard, hot and/or cold fluid can flow from the checkerboard patterned flow channels 103, 105, through the header transition portion 301, and converge into a header in columns and/or rows. For example, the hot flow channels 303 can be aligned in one or more hot columns 303a and/or rows 303b and such that the cold flow channels 305 can be aligned in separate cold columns 305a and/or rows 305b that are parallel with the hot columns and/or rows. The reverse flow direction can also be utilized to separate flow into the checkerboard pattern from a slotted or other pattern.

Figure 4C:
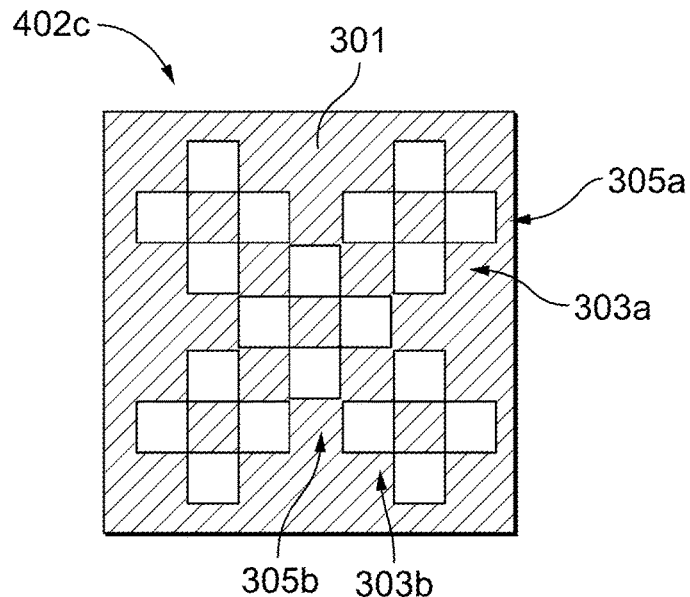
FIG. 4C is a cross-sectional view of another embodiment of a second end of the header transition portion of FIG. 3A.

As shown in FIGS. 4A-4C, the hot columns 303a and/or rows 303b can alternate with the cold columns 305a and/or rows 305b. Referring to FIG. 4C, the transition channels 303, 305 need not necessarily communicate side by side or form a single slot/slot channel. The transition channels 303, 305 at the second end 402 can align with space between. This can allow for the transition channels 303, 305 to align in both rows 303a, 305a and columns 303b, 305b as shown.

The direction of alignment can be selected to allow a desired header attachment (e.g., horizontal/in plane, vertical). As appreciated by those skilled in the art, vertical slots (i.e., columns) enable easier connections to flow inlet/outlet ducts which are installed on top/bottom side of the body 101, and horizontal slots (i.e., rows) enable headers which are located in the same horizontal plane as the body 101. Any other suitable transition methods, shapes, and/or structures to transition from checkerboard patterns to row-wise or column-wise patterns (e.g., slotted channels) can also be employed for flow manifolding.

The header transition portion 301 can be additively manufacture or made in any other suitable manner. In certain embodiments, the header transition portion 301 can be additively manufactured with the core (e.g., body 101 shown in FIGS. 1A-1C) such that the core and the header transition portion 301 are monolithic. However, it is contemplated that the header transition portion 301 can be separate from body 101 and attached in any suitable manner.

It is contemplated that the heat exchanger 100 can include any suitable header configured to connect the flow channels 103, 105 to a flow source (not shown) while isolating the hot flow channels 103 from the cold flow channels 105. The header may be formed monolithically with the body 101 and/or the header transition portion 301 of the heat exchanger 100 for example. In certain embodiments, the header can suitably attached in any other manner to cause the hot flow channels 103 to converge together and/or to cause the cold flow channels 105 to converge together.

Figure 5:
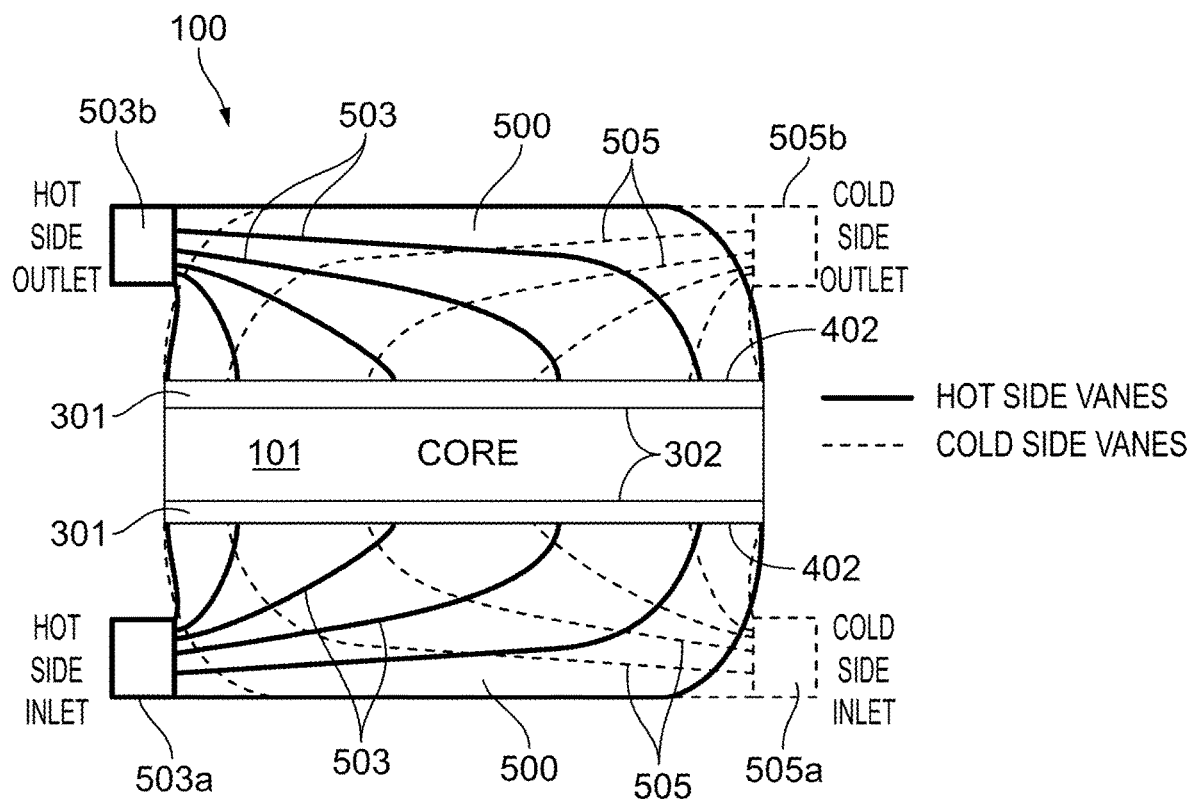
FIG. 5 is a schematic diagram of an embodiment of a header scheme of a heat exchanger in accordance with this disclosure.

Referring to FIG. 5, one or more headers 500 can be fluidly connected to the hot flow channels 103 and/or the cold flow channels 105 via a plurality of hot vanes 503 and/or cold vanes 505, respectively, wherein the vanes 503, 505 can fluidly connect individually to each flow channel 103, 105 (e.g., via the aligned transition channels 303, 305 at the second end 402 of the transition portion 301) and converge at an inlet/outlet (e.g., hot inlet 503a/outlet 503b, cold inlet 505a/outlet 505b) of the header 500. For example, as shown, cold vanes 505 and hot vanes 503 can exist in different planes as a result of the alignment of transition channels 303, 305 and be stacked on each other along the thickness of the core/body 101. The vanes 503, 505 can connect to each flow channel 103, 105 (e.g., number of vanes=number of channels) or each vane 503, 505 can connect to multiple flow channels (e.g., number of vanes<number of channels).

The vanes 503, 505 can reduce flow maldistribution and pressure drop. The vanes 503, 505 can also add surface area and thermal mass to the headers, thus reducing the transient thermal stress due to thermal mass mismatch between the core and headers found in conventional heat exchangers. Transition from rectangular flow slots to circular ducts like can occur by reducing the slot height in the given header design space. In certain embodiments, there can be fewer vanes 503, 505 than flow channels 103, 105 when there is a transition portion to create hot/cold columns/rows.

Figure 6:
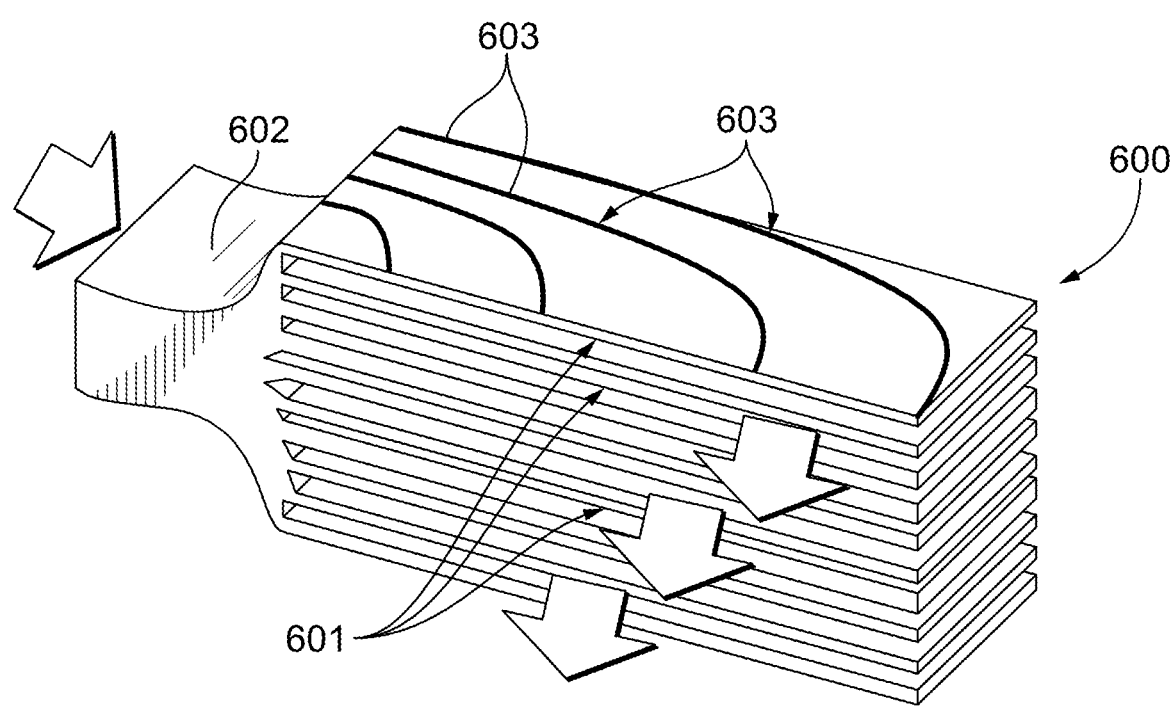
FIG. 6 is a perspective view of an embodiment of a header in accordance with this disclosure.

Referring to FIG. 6, an embodiment of a single side (e.g., hot or cold) header 600 is shown. The header 600 includes a plurality of fins 601 which include vanes 603 defined therein, or any other suitable flow passage (e.g., a hollow slot). The flow passages within the fins 601 are in fluid communication with the inlet/outlet 602 and converge at the inlet/outlet. The inlet/outlet 602 can be configured to connect to any suitable fluid source or sink (e.g., a circular connector, a rectangular connector).

As is appreciated by those skilled in the art, another similar header 600 can have its fins 601 inserted in the spaced between fins 601 such that a second side (e.g., a cold side) can also be connected to a header 600 in roughly the same space. However, it is contemplated that no header for a cold side flow is necessary (e.g., air or other fluid can merely flow through the spaced between fins 601.

Referring to FIGS. 5 and 6, as shown, a fluid can enter the inlet/outlet 602, flow through fins 601 and into the transition portion 301 due to the aligned arrangement of transition channels 303, 503. The flow can then flow through the transition portion 301, morph into a checkerboard pattern (e.g., as shown in FIG. 3A), travel through the body 101, travel through another transition portion 301, morph back into an aligned pattern (e.g., as show in FIG. 4A), and enter fins 601 of an outlet header 500, 600 where the flow can converge to a single outlet. As appreciated by those skilled in the art, the hot side and the cold side can be routed in opposite directions such that the cold side inlet 505a is on the same side as the hot side outlet 503b.

Referring to FIGS. 1A-1D, a method for manufacturing a heat exchanger 100 can include forming a body 101 to include a plurality of hot flow channels 103 and a plurality of cold flow channels 105 such that the cold flow channels 105 are fluidly isolated from the hot flow channels 103, and such that the hot flow channels 103 and cold flow channels 105 are arranged in a checkerboard pattern. Forming the heat exchanger 100 can include additively manufacturing the heat exchanger 100, however, any other suitable forming method is contemplated herein.

Referring to FIGS. 3A-4C, additively manufacturing the heat exchanger 100 can include monolithically forming a header transition portion 301 in fluid communication with the flow channels 103, 105. Forming the header transition portion 301 can include modifying the checkerboard pattern (e.g., as shown in FIG. 3A) to transition into an aligned pattern (e.g., as shown in FIGS. 4A-4C) to fluidly connect to a header within the header transition portion 301. Additively manufacturing the heat exchanger 100 can include monolithically forming a header 500 in fluid communication with the header transition portion 301.

Figure 7:
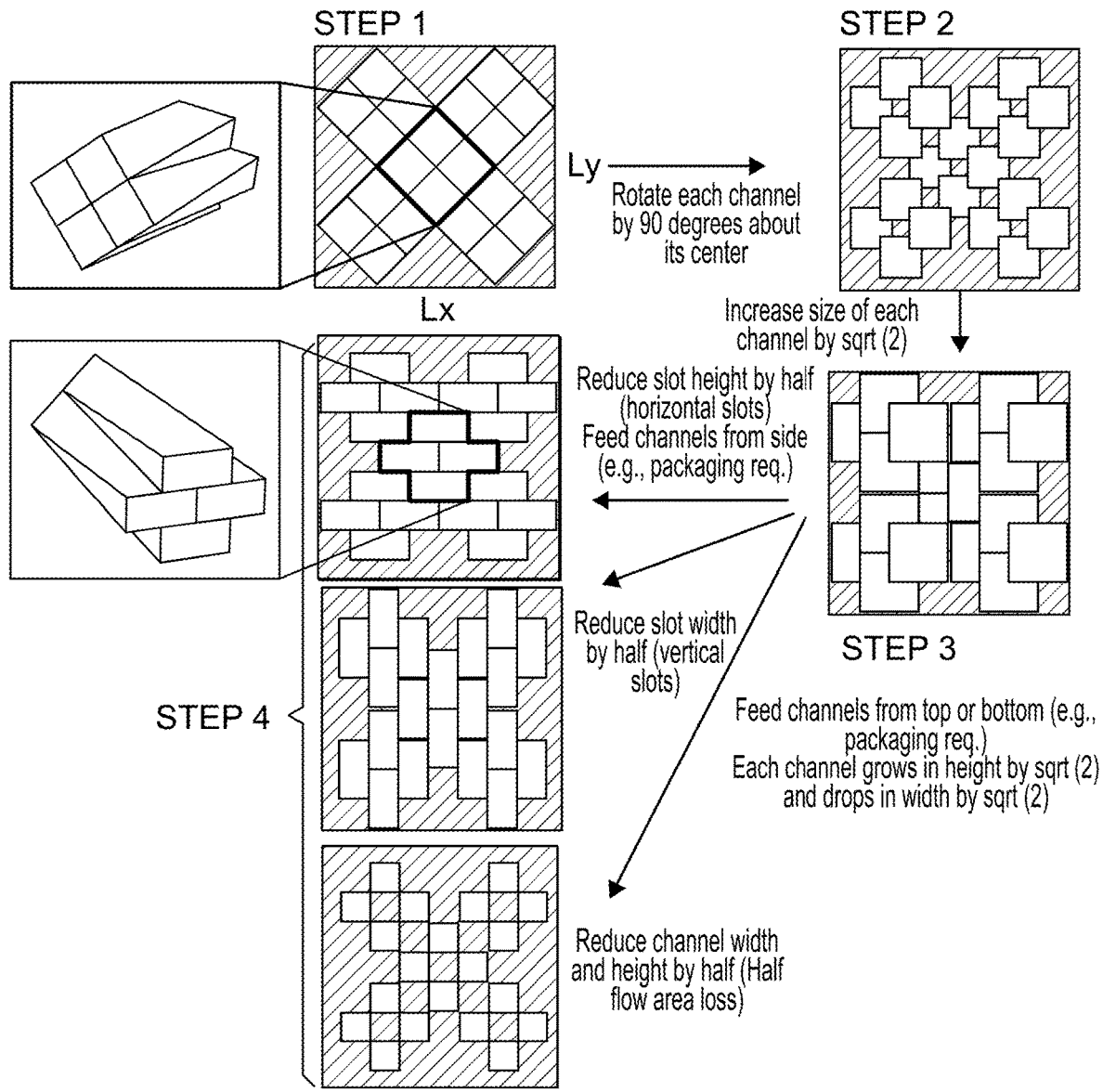
FIG. 7 is a schematic flow diagram showing an embodiment of transition steps of a header transition portion in accordance with this disclosure.

Referring to FIG. 7 in conjunction with FIGS. 3A-4C, an embodiment of a method for forming a header transition portion 301 is schematically shown. Step 1 includes manufacturing corresponding transition channels 303, 305 that fluidly communicate with flow channels 103, 105. In step 2, the transition channels 303, 305 can be rotated about their center (e.g., 90 degrees as shown), while still maintaining a wall between each hot and cold channel. In step 3, the size of each transition channel 303, 305 can be increased to maintain the same header domain area/volume as the core/body 101. Step 4 is shown illustrating three different embodiments of creating a second end of the transition portion 301, each causing the transition channels 303, 305 to form an aligned pattern (e.g., forming slots as in FIGS. 4A and 4B) for attachment to a header. While the figures show three possible embodiments, any other suitable patterns are contemplated herein.

In accordance with at least one aspect of this disclosure, a method for manufacturing a heat exchanger 100 includes forming a body 101 to include a plurality of hot flow channels 103 and a plurality of cold flow channels such that the cold flow channels 105 are fluidly isolated from the hot flow channels 103, and such that at least one of the hot flow channels 103 or the cold flow channels 105 have a changing characteristic along a length of the body 101. Forming the heat exchanger 100 can include additively manufacturing the heat exchanger 100 using any suitable method (e.g., powder bed fusion, electron beam melting or the like).

Embodiments of this disclosure can allow maximization of primary surface area for heat exchange while allowing flexibility to increase or decrease the ratio of hot side to cold side flow area. Being able to change the relative amount of flow area on each side of the heat exchanger is necessary to fully utilize the pressure drop available on each side. Embodiments as described above allow for enhanced control of flow therethrough, a reduction of pressure drop, control of thermal stresses, easier integration with a system, and reduced volume and weight. Unlike conventional multi-layer sandwich cores, embodiments as described above allow for channel size adjustment for better impedance match across the core.

Further, in additively manufactured embodiments, since the core (e.g., body 101) can be made out of a monolithic material, the material can be distributed to optimize heat exchange and minimize structural stresses, thus minimizing the weight. Bending stresses generated by high pressure difference between cold and hot side are greatly reduced by adjusting curvature of the walls and appropriately sized corner fillets. Such solution reduces weight, stress, and material usage since the material distribution can be optimized and since the material works in tension instead of bending.

The methods and systems of the present disclosure, as described above and shown in the drawings, provide for heat exchangers with superior properties including reduced weight and/or increased efficiency. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A heat exchanger, comprising:
a body;
a plurality of first flow channels defined in the body;
a plurality of second flow channels defined in the body, the second flow channels fluidly isolated from the first flow channels, wherein the first flow channels and second flow channels are arranged in a checkerboard pattern, and wherein each of the first flow channels are entirely flush against each adjacent second flow channel throughout; and
a header fluidly connected to the first flow channels or the second flow channels via a plurality of first vanes and second vanes, respectively, wherein each of the first vanes and each of the second vanes connect to a corresponding flow channel and converge at an inlet/outlet of the header, wherein the first and second flow channels include changing flow areas along a length of the body, wherein shapes of the changing flow areas includes a first polygonal flow area at a first flow inlet at a first end of the flow channel which transitions to a second polygonal flow area having more sides at a first flow outlet than at a second end of a corresponding flow channel, wherein at least one of the flow channels includes a non-symmetric cross-sectional shape, and at least one of the flow channels includes a symmetric cross-sectional shape, wherein the changing flow area of each of the first flow channels increases toward a first flow outlet of the heat exchanger and wherein the changing flow area of each of the second flow channels decreases in a same direction, and wherein the body comprises a constant cross-section from a first end to a second end.

2. The heat exchanger of claim 1, wherein the first and second flow channels include at least one of a rhombus shape and a hexagonal shape.

3. The heat exchanger of claim 1, further including a header transition portion where the first and second flow channels transition from the checkerboard pattern to an aligned pattern such that the first flow channels are aligned in one or more first columns and rows, wherein the second flow channels are aligned in separate second columns and rows that are parallel with the one or more first columns and rows.

4. The heat exchanger of claim 3, wherein the one or more first columns and rows alternate with the respective second columns and rows.

5. The heat exchanger of claim 4, wherein the one or more first columns and rows merge together to form slot shaped channels.

6. The heat exchanger of claim 5, wherein the second columns and rows merge together to form slot shaped channels.

7. The heat exchanger of claim 5, further comprising a plurality of slot shaped header channels extending from the inlet/outlet of the header, wherein the slot shaped header channels converge at the corresponding inlet/outlet and are aligned with the one or more first columns and rows and the second columns and rows.

* * * * *